Figure 8:
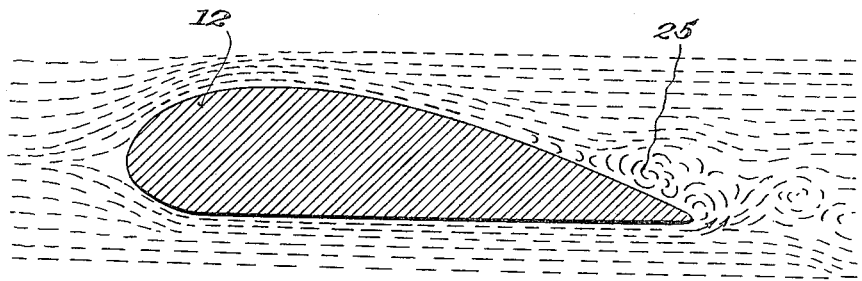

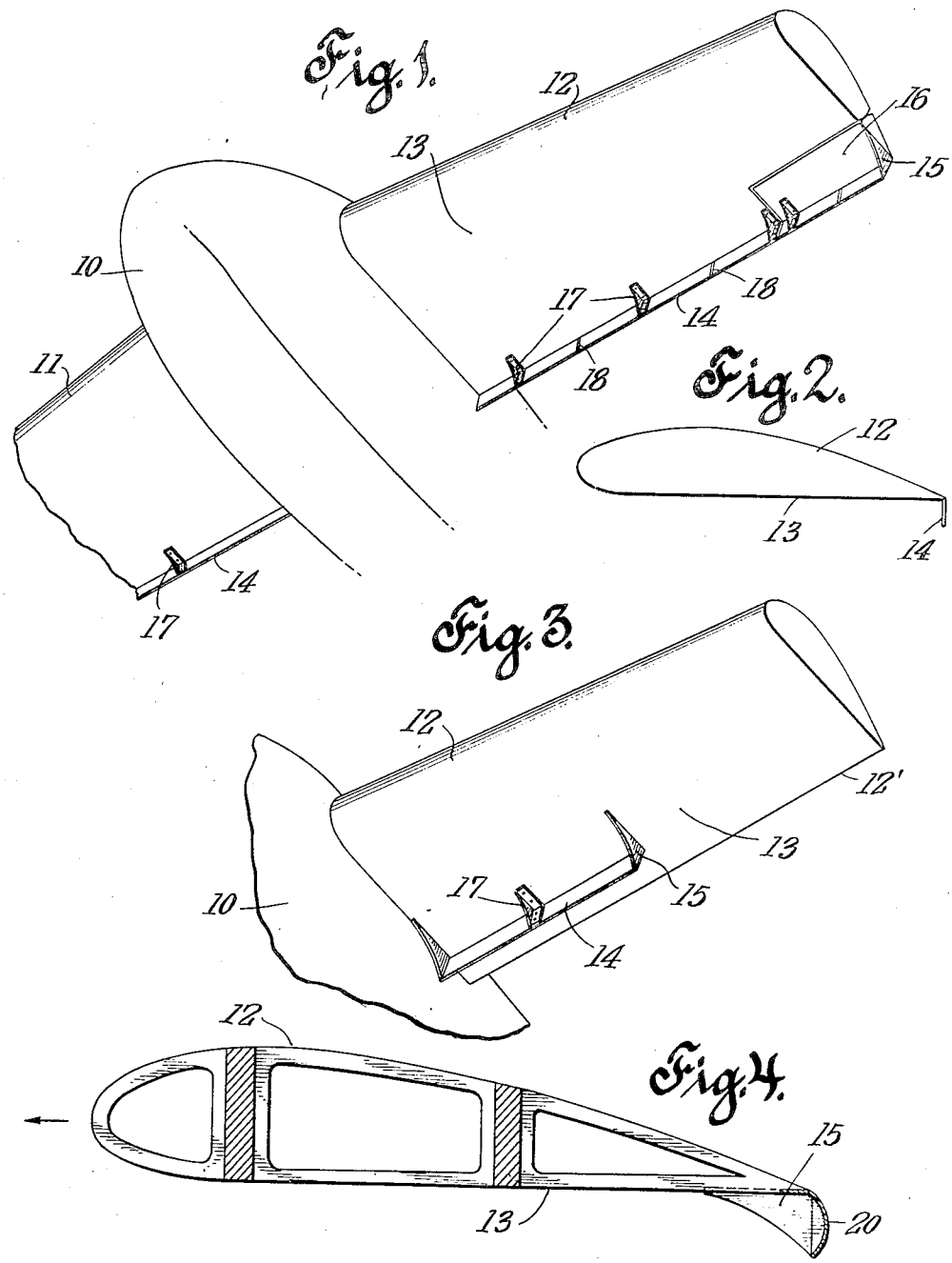

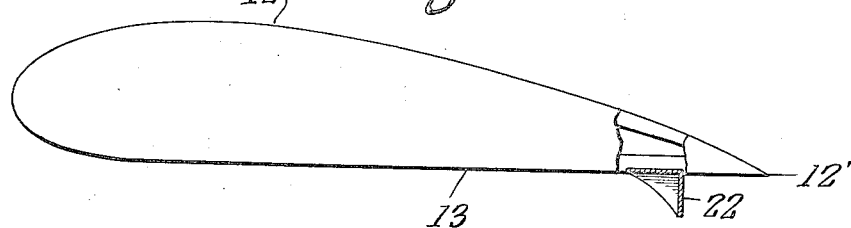
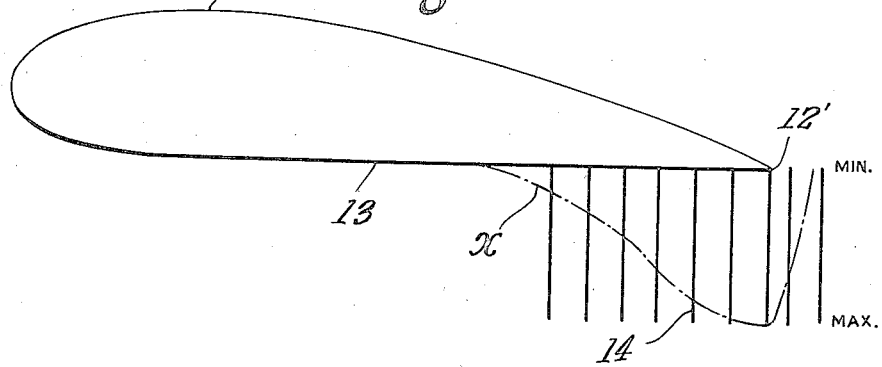
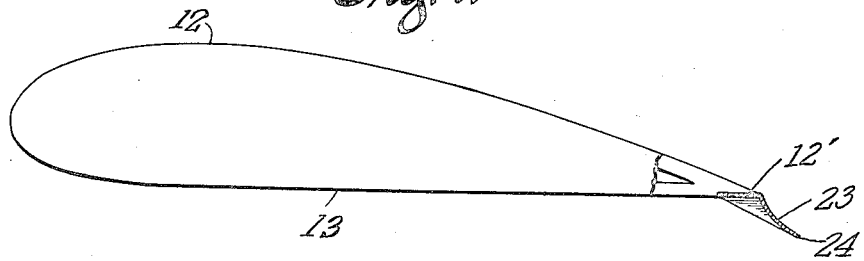

Jan. 3, 1933.　　　　E. F. ZAPARKA　　　　1,893,064
AIRCRAFT
Filed April 3, 1931　　　3 Sheets-Sheet 3

Inventor
Edward F. Zaparka,
By Braselton Whitcomb & Davis
Attorneys

Patented Jan. 3, 1933

1,893,064

UNITED STATES PATENT OFFICE

EDWARD F. ZAPARKA, OF NEW YORK, N. Y., ASSIGNOR TO ZAP DEVELOPMENT COMPANY, OF NEW YORK, N. Y., A CORPORATION OF DELAWARE

AIRCRAFT

Application filed April 3, 1931. Serial No. 527,433.

My invention relates in general to an aircraft arrangement whereby the efficiency of the supporting airfoil is materially increased and involves the provision of means whereby the total lifting power of the airfoil is greatly increased, thereby permitting a reduction in the speed at which the airplane takes off or lands, and an increase in the load carried per unit area without increasing the landing speed. Or, if I so desire, I may so construct the airfoil as to provide an increased rate of climb and increased cruising and maximum speed. Thus, the invention not only increases flying safety enabling average individuals to fly easily, but it also provides a more efficient machine as a whole. By my invention I also provide means for improving the lateral control of the aircraft.

As one embodiment of my invention, I provide means arranged in connection with the lift producing means of the craft, such as a wing, blade, or an airfoil, whereby the circulation or relative hypothetical velocity of air around the same is increased. At the same time, with my invention the burble point occurring with increased angles of attack, is materially delayed, thereby reducing the danger of the aircraft stalling or spinning.

In ordinary standard wings the lift curve at the angle of maximum lift usually drops off quickly, and this drop in lift constitutes a source of great danger, particularly in commercially loaded aircraft; but the lift curve of my invention declines gradually after the maximum point is reached and thus inherently embodies the capacity to avoid the hitherto dangerous stalling of the machine and eliminating the possibility of spinning.

By my invention I provide means for further improving the flow of air on the upper surface of the wing or airfoil, due to the further fact that I provide means operative to prevent the tendency toward equalization of energy from the pressure side to the vacuum side of the wing or airfoil. I provide means for preventing or materially delaying the discontinuity of the air circulation which obviously thereby improves the action of the upper surface to further increase the lift coefficient per unit area.

With my invention under all normal conditions of flight, an aircraft so equipped will be subject to less variations in the angle of attack than an aircraft with an ordinary airfoil. With an ordinary airfoil, the center of pressure travels forwardly and rearwardly in accordance with the angle of attack bringing about nose heavy and/or tail heavy conditions which may make the aircraft unstable and liable to spin. With my invention the variations in the angle of attack in normal conditions of operation are greatly reduced and the center of pressure always remains closer to the center of gravity and the aircraft has, therefore, greater ability and is more easily controlled.

A further object of my invention is to improve the lateral control of the aircraft by incorporating the arrangement above referred to in the ailerons themselves.

Thus, by use of my invention, commercial aviation is greatly enhanced, the operation is more efficient, the factor of safety improved, and the payload per horsepower materially increased.

With these and other objects in view, the invention resides and consists in the construction and novel combination and arrangement of certain embodiments thereof, hereinafter more fully described and illustrated in the accompanying drawings, it being understood that various other arrangements and changes in the form, proportion, size or other details of construction may be resorted to without departure from the spirit of the invention.

I have ascertained by an elaborate series of wind tunnel tests conducted at one of the most scientific aerodynamic laboratories known that the surprising results hereinbefore mentioned are obtained as stated, and moreover, by actual tests and calculations, I have determined the proper engineering requirements to give the most desirable aerodynamic results with my invention.

Referring to the drawings, Figure 1 is a partial perspective view illustrating my improved aircraft. Figure 2 is a transverse diagrammatic section illustrating one embodiment of the invention. Figure 3 is a view similar to Figure 1, showing an actual construction with the flap positioned centrally of the ship but extending toward the outer portion of the wing. Figure 4 is a vertical transverse section through an airfoil with a modified embodiment of my invention, while Figures 5 and 7 are similar views of still further modified arrangements.

Figure 9:
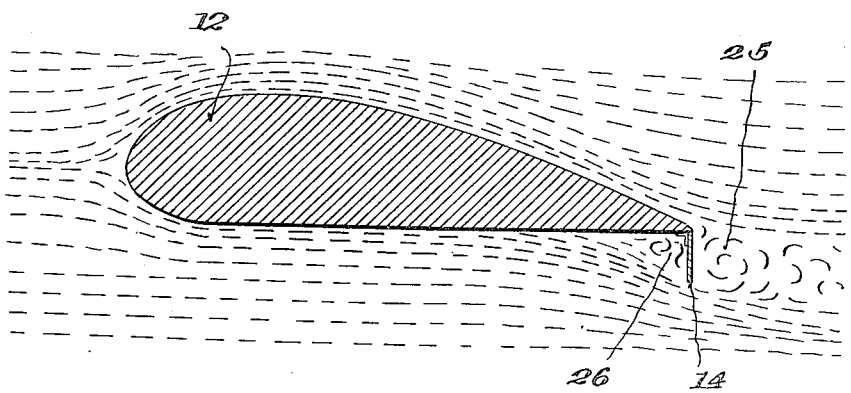

Figure 6 is a schematic diagram illustrating the efficiency of the arrangements of my invention, while Figures 8 and 9 are airflow diagrams illustrating the aerodynamic principles obtained by my invention as shown in Figure 9 over standard constructions indicated in Figure 8.

In the drawings, in Figure 1 I have illustrated a monoplane showing in suggested form a fuselage 10 with wings 11 and 12. The wing or airfoil 12 may be of any transverse configuration, as illustrated in Figure 2, constructed in accordance with the known principles of aerodynamic engineering.

As one embodiment of obtaining the results heretofore indicated by my invention, I provide at the lower side 13 of the airfoil 12 a depending flap 14 which extends in the particular illustration of Figure 1 from the fuselage 10 to the end of the airfoil, having an end plate 15 at the extremity thereof. This flap 14 can extend entirely along the rear edge of the airfoils 11 and 12, or only a partial distance thereof as shown in Figure 3. Tests have shown that a flap extending over approximately 60% of the total length of the wing measured from the center of the ship, produces nearly as much added lift as extending the same to near the tip of the wing. Moreover, as will be apparent from Figure 1, I have applied this member or element 14 to the ailerons 16. As shown, the flap 14 is attached by braces 17, and in order to further strengthen the same, it may be provided with outstanding ribs 18.

The depth of the flap 14 may be uniform throughout its length or the same may taper down from end to end with the wide end at the fuselage and the small end at the tip of the wing, or vice versa. I have found the vertical depth to be satisfactory at from 5% to 15% of the cord length.

In Figure 4 I have illustrated more of the structural characteristics of the airfoil 12, and in this case a curved flap or rigid depending element 20 is substituted in lieu of the rigid flap 14 of Figures 1 to 3. By curving the flap 20 in concave toward the direction of flight, a more efficient aerodynamic element for increasing the drag is provided.

In the embodiments illustrated as means for carrying my invention into practice, I have found that the element 14 may be spaced at various distances forward from the trailing edge of the airfoil, as illustrated in Figure 5, where the rigid flap 22 is located some distance from the trailing edge 12'.

In Figure 7 I have illustrated a further embodiment of my invention in the flap 23 providing a convex surface in the direction of flight in contra-distinction to the concave flap shown in Figure 4. In the embodiment of Figure 7, it will be further noted that the flap 23 extends beyond the trailing edge of the airfoil section 12, but the space between the extreme rearward tip 24 of the flap 23 is completely filled by the obstruction of the flap to the trailing edge 12' of the airfoil 12.

In Figure 6 I have illustrated diagrammatically a curve X which illustrates results of my present tests, showing the increase in lift obtained at various positions of the flap 14 with respect to the trailing edge 12' of the airfoil 12. It will be seen that when the flap is placed rearwardly the amount of added lift decreases rapidly to zero. When the flap is located forwardly the curve of the added lift falls off only gradually. However, with the flap 23 illustrated in Figure 7, it will be understood that the curve X would not show the pronounced drop beyond the trailing edge illustrated in Figure 6.

In Figure 8 I have illustrated standard flow curves for a selected type of airfoil based on actual tests, the arrangement of Figure 8 showing a relatively low or a horizontal angle of attack and the burble condition at 25 acting to break up the character of the flow aerodynamically. With this angle of attack increased the dangerous point tending to cause the air craft to stall or go into a spin shown by the burble action of the air, will eventually cause "breakdown" in the lift when the "burble point" is reached.

In Figure 9 I have illustrated the striking results obtained by the use of the flap 14 with an airfoil similar to that illustrated in Figure 8, in this case the burble point failing to appear at an angle of attack equal to that illustrated in Figure 8. This also illustrates aerodynamically how with the rigid flap 14 or its equivalent I provide an airfoil construction which presents an equivalent of a higher angle of attack at all positions, as it will be seen that the flow over the upper surface is even and that the total surface is utilized at greater efficiency, the burble action occurring only to the rear of the flap 14 and at 26, where pressure is created forwardly of the flap 14 due to the resistance created by the flap which increases the lifting power of the reaward portion of airfoil 12.

Various other modifications of the invention as disclosed may be made, and, therefore, I do not wish to be restricted to the particular embodiments shown.

Having thus described my invention, what I desire to claim is:

1. In an aircraft, an airfoil construction comprising an upper surface; a lower surface, said surfaces arranged to meet at a trailing edge and produce in flight a reduction of pressure above the upper surface and an increase in pressure below the lower surface; and a relatively rigid downwardly extending element connected to said airfoil and extending below said lower surface at the trailing edge thereof to increase the pressure on the lower surface and reduce the turbulence on the rearward portion of the upper surface.

2. A sustention body having a curved upper surface; a lower surface intersecting the same at the trailing edge, said surfaces arranged to produce in flight a reduction of pressure above the upper surface, an increase of pressure below the lower surface, and a longitudinally extending surface connected at said intersecting edge of the lower surface with the upper surface, said longitudinal surface projecting substantially at right angles to said lower surface and arranged to produce an increase in pressure on the lower surface and prevent an interchange of the increased pressure on the lower surface and reduced pressure on the upper surface.

3. An aircraft sustention body comprising an upper surface, a lower surface, said surfaces uniting in a projecting nose and intersecting at the trailing edge, in combination with a downwardly exending surface located at said trailing edge and extending longitudinally of said body arranged to cut off interchange of pressure around the trailing edge from the lower surface to the upper surface, and to increase the pressure on the lower surface.

4. In an aircraft, an airfoil construction comprising an upper surface; a lower surface, said surfaces meeting at a trailing edge and arranged to produce in flight a reduction in pressure above the upper surface and an increase in pressure below the lower surface; and an obstruction element extended from said airfoil closely adjacent the trailing edge thereof to increase the pressure under the lower surface and reduce the turbulence on the rearward portion of the upper surface.

5. In an aircraft, an airfoil construction comprising an upper surface; a lower surface, said surfaces arranged to produce a difference in pressure above the upper surface relative to the pressure below the lower surface, said upper surface being relatively immovable with respect to said airfoil body and to said other surface; and downwardly directed means connected to said airfoil closely adjacent the trailing end thereof, said means comprising a drag-producing surface independent of said upper surface arranged to directly contact with said lower surface at its upper end to cut off flow or interchange of pressure around the trailing end of the air-foil, said drag-producing surface extending adjacent a plane substantially perpendicular to the airfoil at its trailing end to increase the pressure on the lower surface and reduce the turbulence over the upper surface.

6. In an aircraft, an airfoil construction comprising an upper surface; a lower surface, said upper surface being relatively immovable with respect to said airfoil body and said surfaces arranged to produce a difference in pressure above the upper surface relative to that below the lower surface; and downwardly extended drag-producing means located at the rear of the center of the lower surface to increase the pressure on the lower surface and reduce the turbulence over the rearward portion of the upper surface, said means including a flap construction independent of said upper surface, said flap construction arranged to substantially cut off the flow or interchange of pressure around the trailing end of said airfoil, said flap construction extending adjacent the plane passing through the trailing end of the air foil and substantially perpendicular to the airfoil.

7. In an aircraft, a movable force-producing body comprising an airfoil having main opposed surfaces, said surfaces diverging one from the other at the nose, and converging toward the trailing end adjacent the rear of said body, one of said surfaces being relatively immovable with respect to said airfoil body, said surfaces arranged to produce a relative difference in pressures adjacent said surfaces, in combination with a drag-producing means arranged to increase the pressure adjacent one of said surfaces, and reduce turbulence over said last mentioned surface by obstructing interchange of pressure around the rear of the airfoil body; said means comprising an additional independent resistance surface located relatively closely adjacent the trailing end of the airfoil body in such close proximity thereto as to substantially obstruct pressure interchange between said main surfaces, said resistance element arranged to extend a depth of not over from 20% to 25% of the chord length of said airfoil and arranged to extend adjacent a plane substantially perpendicular to said body and passing through the trailing end thereof.

8. In an aircraft, an airfoil construction comprising an upper surface; a lower surface, said upper surface being relatively immovable with respect to said airfoil body and said surfaces arranged to produce a difference in pressure above the upper surface relative to that below the lower surface; and downwardly extended drag-producing means located at the rear of the center of the lower surface to increase the pressure on the lower surface and reduce the turbulence over the rearward portion of the upper surface, said means including a flap construction independent of said upper surface, said flap construction forming a resistance element arranged to extend a depth of not over from 20% to 25% of the chord length of said airfoil and arranged to extend adjacent a plane substantially perpendicular to said body and passing through the trailing end thereof.

9. In an aircraft, a movable force-producing body comprising an airfoil having main opposed surfaces, said surfaces diverging one from the other at the nose, and converging toward the trailing end adjacent the rear of said body, one of said surfaces being relatively immovable with respect to said airfoil body, said surfaces arranged to produce a relative difference in pressures adjacent said surfaces, in combination with a drag-producing means arranged to increase the pressure adjacent one of said surfaces, and obstruct interchange of pressure around the rear of the airfoil; said means comprising a flap construction independent of said upper surface, said flap construction arranged to substantially cut off the flow or interchange of pressure around the trailing end of said airfoil, said flap construction arranged to have its lower edge below and in substantially the perpendicular to the chord of said airfoil body at its trailing edge.

10. An aircraft sustention body comprising an upper surface, a lower surface, said surfaces uniting in a projecting nose and extending rearwardly with the upper surface extended to the trailing edge, in combination with a downwardly extending surface arranged to have its lower edge below and in substantially the perpendicular to the chord of said aircraft body at that edge, said surface extending longitudinally of said body arranged to increase the pressure on the lower surface to reduce interchange of pressure to the upper surface from that portion of the lower surface located forwardly of said downwardly extending surface.

11. In an aircraft, an airfoil construction comprising an upper surface; a lower surface, said surfaces meeting at a nose and converging rearwardly and arranged to produce in flight a reduction in pressure above the upper surface and an increase in pressure below the lower surface; and an obstruction element comprising a flat having its upper edge located adjacent said lower surface and arranged to have its lower edge below and in substantially the perpendicular to the airfoil chord at the trailing edge.

12. In an aircraft, a movable force-producing body comprising an airfoil having main opposed surfaces, said surfaces diverging one from the other at the nose, and converging toward the trailing end adjacent the rear of said body, one of said surfaces being relatively immovable with respect to said airfoil body, said surfaces arranged to produce a relative difference in pressure adjacent said surfaces, in combination with a drag-producing means arranged to increase the pressure adjacent one of said surfaces, and reduce turbulence over said last mentioned surface by obstructing interchange of pressure to one of said main surfaces from that portion of the other main surface located forwardly of said drag-producing means; said means comprising an additional resistance surface located relatively closely adjacent the trailing end of the airfoil body in such close proximity thereto as to substantially obstruct pressure interchange between said main surfaces, said resistance element adapted to be arranged whereby its lower edge is below and in substantially the perpendicular to the airfoil chord at the trailing edge thereof.

In testimony whereof, I affix my signature.
EDWARD F. ZAPARKA.